Nov. 23, 1943.  J. F. SEITZ  2,334,962
METHOD OF PRODUCING MOTION PICTURES OF CHANGING SIZES AND SHAPES
Filed April 22, 1940  2 Sheets-Sheet 1
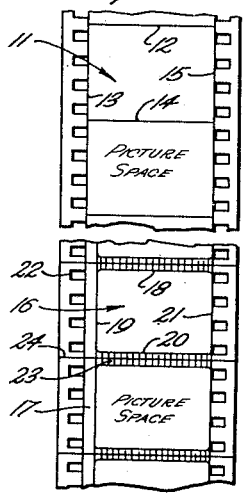
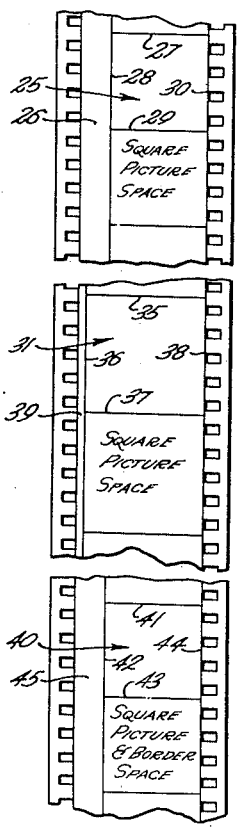
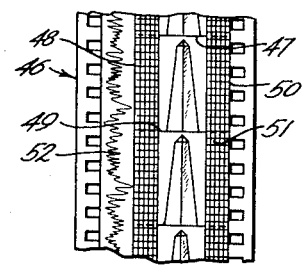
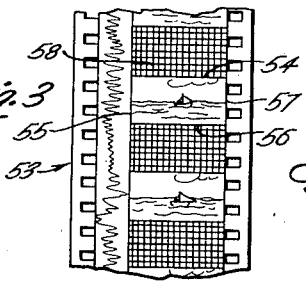
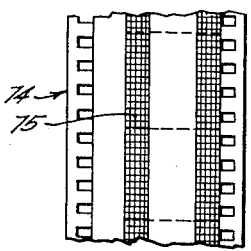
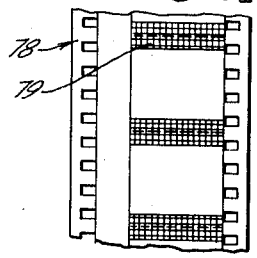
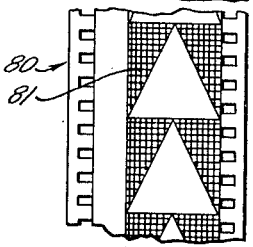
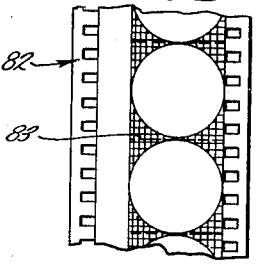
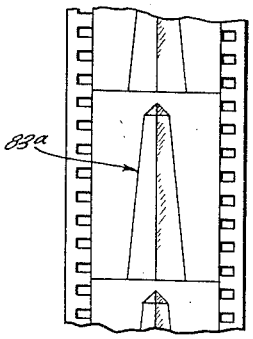
Inventor
JOHN F. SEITZ
By Hazard and Miller
Attorneys Nov. 23, 1943.  J. F. SEITZ  2,334,962
METHOD OF PRODUCING MOTION PICTURES OF CHANGING SIZES AND SHAPES
Filed April 22, 1940  2 Sheets-Sheet 2
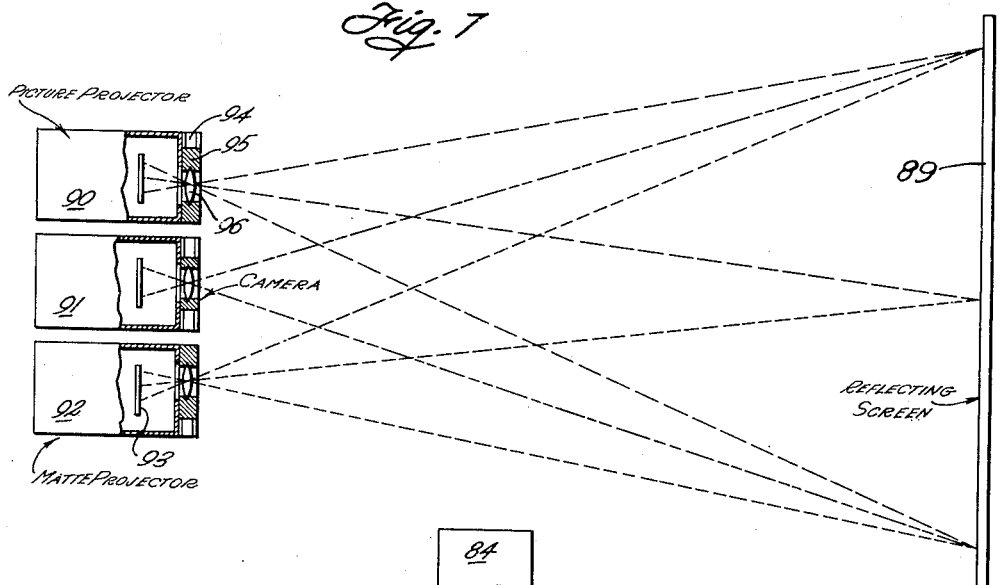
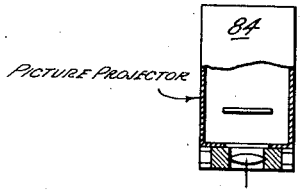
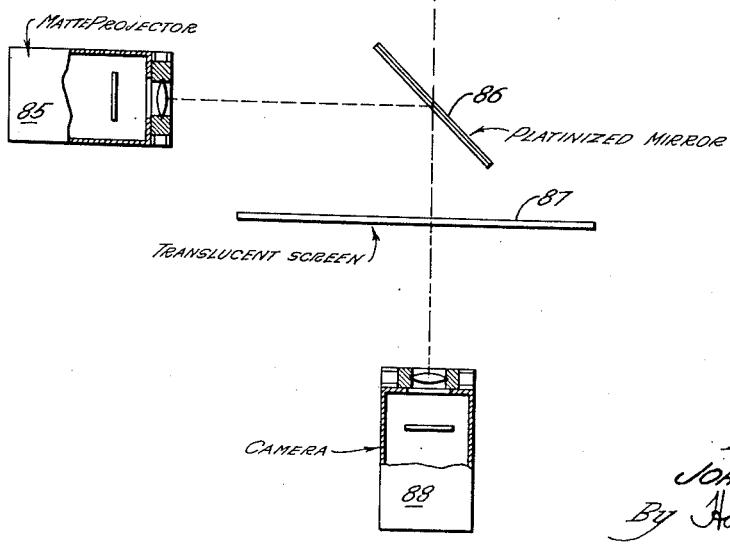
Inventor
JOHN F. SEITZ
By Hazard and Miller
Attorneys Patented Nov. 23, 1943

2,334,962

UNITED STATES PATENT OFFICE 2,334,962

METHOD OF PRODUCING MOTION PICTURES OF CHANGING SIZES AND SHAPES

John F. Seitz, Los Angeles, Calif.

Application April 22, 1940, Serial No. 330,931

4 Claims. (Cl. 88—16)

This invention is concerned with the creation of a new form of presentation of motion pictures in which the present fixed boundaries or proportions of the projected pictures on the screen are eliminated. In their stead I propose to project pictures of such sizes, shapes or proportions as to best frame, contrast or accent them, together with the means and apparatus to effect these changes at any predetermined time or speed.

For example I maintain that the maximum pictorial or emotional effect cannot be obtained if a broad view of a desert, a forest of tall trees, an extensive ocean view or a lofty cathedral or monument are depicted on a screen of fixed shape and proportions. So I propose that scenes emphasizing the horizontal, such as the desert and ocean views, be exhibited in a frame wide compared with its heighth, scenes emphasizing the vertical, the cathedral or monument, can be exhibited in a frame narrow compared with its heighth. Other scenes can be confined within the spaces and shapes which frame them to the best advantage, such as squares, triangles, circles, ovals and other shapes or combinations of shapes. The shape of the screen upon which these pictures are to be projected is preferably either a square or circle to give the same latitude in the vertical as in the horizontal line for the changes in the pictures outlined.

In the satisfactory projection of such pictures, it is necessary for the portions of the screen outside the margins of the picture to be as dark as possible. It is also necessary to provide mattes which embody the desired transitions from shape to shape with the accompanying changing dissolving and diffusing effects, therefore, the provision of means to make mattes embodying the desired transition effects and the provision of means to make those portions of the screen outside the desired picture shape as dark as possible, are the object of this invention. The cameras are used in my procedure for making what I term a basic picture only, the finished print containing pictures of the desired shape for exhibition will always be made from a duplicate negative prepared by the means and methods described hereunder. In making the original negative or basic picture the present standard camera movement could be used with a square aperture plate, or the movement could be changed to give a length of five standard perforations of the film as against four in the present standard.

Where it is desired to emphasize the vertical height, the camera can be arranged to pull down a double length of film to form each frame, that is, having a feed of eight standard perforations; if it is desired to emphasize the horizontal characteristics, such a camera could be designed to be mounted on one side, or if used in the normal photographing position an optical system of mirrors could reflect the scene from the horizontal to the vertical, or as an alternative, a wide film camera could be used. The projector may be standard with a four perforation feed, the positive being reduced from the negative, if necessary, to conform to this reduced feed, or it could have a five perforation feed. In the projection of motion pictures of changing shapes and sizes on a screen either square or circular in shape, it is evident that as certain portions of this screen will not be used, that is, not filled by picture, it becomes necessary for the unused portions of this screen to be as dark as possible to reflect no light whatever which might detract attention from the picture.

Therefore, the provision of means to reduce the amount of light transmitted through the film to the minimum in those portions outside the picture becomes the primary object of this invention.

Several methods may be employed to accomplish the object of this invention, to secure sufficient opacity of blackness in the unused portions of the film to project a satisfactory picture.

A preferred method of procedure is as follows: The basic picture or original negative is made by the camera on standard negative emulsions. The photographic operation would, preferably, be direct, that is, without any attempt being made by the cameraman except in certain instances to decide the shape or size of the final picture or to include any of the effects, such as fades, dissolves, diffusions, etc.

From this negative the usual direct positive print for projection is made; from this print a determination is made as to what size or shape the various scenes should be and the manner and speed of transitions from one shape to another. This determination is made by the use of trial mechanical mattes in the projector of various shapes and sizes and a record is made of the length of film for any particular shape. From the mechanical mattes a film matte or traveling matte can be made. This is done after determining the length of the film for each scene or sequence to be used in the final positive.

Photographs are taken on a moving film, using light projected through various specified mechanical mattes in a projecting apparatus. Such mattes may be changed in size while still retaining their essential shape. This procedure produces a film matte which, when completed, has various shapes and sizes of borders in black. The film matte above described will probably have border shapes and sizes which would make too abrupt changes from one general shape to another, hence, transition effects are obtained as set out hereinunder.

The transition effects may be made in at least two distinct manners. In one procedure the fades, dissolves, diffusions, etc., may be made by projection printing of the picture, together with the traveling or film matte in which the transition effects are obtained simultaneously in the picturization and border of the picture. In a second procedure the transitions, such as fades, dissolves, diffusions, etc., are made of the traveling or film matte without the picture and produce a final film matte. The latter matte may then be combined with the picture film in which the picture need not have transition effects included therein, as the transition effects in the matte will incorporate transition effects in the picture when it is used with the final matte. But, if desired, the picture film may be changed by transitions in projection printing before it is combined with the final film matte having the transition changes of shape.

The result is that from the primary negative or a print therefrom, suitably cut, with the film matte, above mentioned, a duplicate negative is obtained from the combined printing of the picture and matte. This duplicate negative embraces all the changing sizes and shapes together with the transitional effects desired in the finished picture. From the duplicate negative the positive prints for theatre projection are made by usual printing operation.

This duplicate negative is printed on what I term increased or double density emulsion. The standard emulsion, referred to herein as of single density, requires about one oz. (Troy), i. e.: 480 grains of silver bromide (AgBr)) or silver iodide (AgI) for 12,000 linear inches of emulsion 1⅜ inches wide, i. e.: to cover 16,500 square inches. In terms of the silver used to secure a theoretical density of 3.0 for positive films, it requires approximately .03 gram of metallic silver per 100 square centimeters. Sensitometric tests are made to determine standard densities of film emulsions. Where in the specification I refer to increased or double density of silver emulsion, these have an increased or double amount of silver bromide or silver iodide per unit area in the undeveloped film and increased or double these amounts of metallic silver in the developed film. The increased or double density may be determined by sensitometric tests. The direct positive print, above mentioned, should have its picture developed to a gamma of .40 and the traveling or film matte should have a gamma of 2.0. The positive print from the duplicate negative is made on increased or double density positive emulsion and this positive is developed to a gamma of 3.0. Therefore, there is on the final positive, a picture having an overall gamma of 1.2 and a matte having a gamma of 6.0. This gives an intense black on those portions of the screen outside of the margin of the picture, that is, on the border of the picture.

In standard motion picture emulsions and methods of processing, it is theoretically possible to achieve a density of about 3.0 in the greatest possible black. A film of such density will transmit about one-thousandth part of light incident upon it. With the emulsions of double density and my method of processing, I theoretically achieve a density of 6.0. This will transmit only a one-millionth part of incident light, hence giving an intense black to the border of a picture. However, a density of 4.0 is, for all practical purposes, sufficiently black.

The above described method is entirely photographic; using the double density emulsion for the final positive, I obtain an extremely dense margin or border for the pictures.

In order to illustrate certain features of my invention, drawings more or less diagrammatic are presented:

Fig. 1 illustrates strips of film showing the standard picture shape for silent and sound pictures.

Fig. 2 shows a strip of film showing the various sized picture spaces used in my invention.

Fig. 3 illustrates strips of film showing the different types of pictures which may be confined within different shapes and sizes of borders, this figure being used to illustrate mechanical and film mattes.

Fig. 4 illustrates strips of film showing different types of film mattes.

Fig. 5 illustrates a section of a negative film with a tall object photographed thereon.

Fig. 6 is a diagram of one type of projection printer using a translucent screen.

Fig. 7 illustrates another type of projection printer using a reflecting screen.

In Fig. 1, 11 indicates a standard section of film as used for silent pictures without sound track. The confines of the picture space are designated by the numerals 12, 13, 14, and 15. 16 designates the type of film used in sound pictures in which there is a sound track 17 at one side of the film. In this case the picture space is confined by the lines 18, 19, 20, and 21. In both of these films the advance is made of four perforations 22. The silent type picture 11 has a proportion of four parts horizontal to three vertical. Therefore, when the sound track is adapted on the film 16 the picture space is required to be narrower and is made in approximately the same proportions. This necessitates there being an unexposed section 23 which intersects the lines 24 marking the distance of individual feed for individual pictures. This unexposed section 23 is formed in the camera and in the projector by the aperture plate.

In Fig. 2 I indicate at 25 a type of film in which the picture space is square. This has a four perforation feed and provides a wider sound track 26 than the standard sound track 17. In this case the picture is confined by the lines 27, 28, 29, and 30. A five perforation feed is indicated at 31 in which, again, the picture space is square, being confined by the lines 35, 36, 37, and 38, and having a sound track 39 which, while narrower than the sound track 26, is narrower than the sound track 17. As described in the specification above, I prefer to use a square frame, the frame being defined as the confining lines of the picture, as this gives the maximum size for changes in any direction of shape of picture and border. Manifestly, the five perforation feed gives a larger square. This, however, would preferably be used only in making the negative as the positive prints should preferably be reduced to the four perforation feed since most of the projectors are standardized at this feed, but it is comparatively simple to change the feed for the requisite number of cameras to supply pictures for a number of projectors. The framing of 25 may be either for a negative or positive. When the negative pictures with the five perforation feed are reduced in the positive the picture frame is as indicated at 40, this having the confining lines 41, 42, 43, 44 with a wide sound track 45. This is, in reality, the same size as the picture space 25.

In Fig. 3 are illustrated strips of film showing different types of pictures which may be enclosed in various shapes and sizes of borders. For instance, the film section 46 shows a picture which is tall compared with its width and is confined in the picture space 47, 48, 49, 50. The proportions are about as illustrated, two horizontal to four vertical. This necessitates two marginal black borders 51. The sound track space is indicated at 52. The film section 53 shows a picture which is wider horizontally compared with its vertical height, the horizontal measurement of the picture space being approximately four relative to two in height. This picture also is indicated by the numerals 54, 55, 56, and 57, requiring two black marginal borders 58 at the top and bottom of the picture. The film section 59 may be considered as having a conventionally sized picture approximately in the proportions of four horizontal to three vertical. The picture space is indicated by the border 61, 62, 63, 64. This has top and bottom black marginal borders 65. The picture film 71 illustrates the use of a circular picture space indicated by the picture line 72. In this construction there are four black borders 73, these being at the corners of each frame.

Fig. 4 illustrates strips of film showing the different types of film mattes. The film section 74 has two marginal mattes 75 for use for the picture of the type 46. A film section 76 has two wide top and bottom black matte sections 77 suitable for a picture of the type 53. The matte section 78 has two black matte borders 79 suitable for a picture of the type 59. The matte section 80 is for a type of picture which may suitably be confined by marginal triangular black borders 81. The matte 82 is suitable for a circular picture and has the black corner matte sections 83. These marginal portions for the circle may extend completely around the frame space of the film and thus give a black border to the picture.

In Fig. 5 is illustrated a section of negative film depicting a tall object indicated at 83a. The frame for this picture occupies substantially the full photographic space on the negative and the negative is fed eight perforations for each frame instead of four, which is the present standard, or five as illustrated in some of the negatives used in my procedure. A negative, such as illustrated in Fig. 5, of a tall object, may then be reduced in printing to form a positive, as shown in connection with the illustration 46 of Fig. 3, and having a wide black border on each side.

Various types of projection printers may be used for printing the mattes combined with the pictures, but to obtain these by projecting the picture and the matte as separate elements two projectors and a recording camera are necessary.

Fig. 6 illustrates in diagram one type of projection printer. In this figure a picture projector for projecting the negative is indicated at 84 and a matte projector for projecting a negative matte at 85. These project on to a platinized mirror 86 which transmits light from the picture projector 84 on to the screen 87 and reflects the light from the matte projector 85 on to the same screen. The picture and the matte may, therefore, be brought into registry and the operator may note the combination of these two elements as projected. The photographic record is made in the camera 88 from the projection on the screen. It is manifest, however, that, if desired, the screen may be omitted and the camera may photograph an aerial image.

In Fig. 7 I illustrate another projector type of printer in which the projection is made on a reflecting screen. In this instance I use a combination of projector and camera and method of procedure somewhat as set forth in my Patent No. 1,898,905, issued February 21, 1933, for Method and apparatus for making motion pictures, referring particularly to the construction and procedure illustrated in connection with Figs. 17 and 17A. In this instance the single screen is indicated at 89, a picture projector at 90, a camera at 91, and a matte projector at 92. Each of these is formed with an aperture plate 93, behind which the film passes, such aperture plate being parallel to the screen. The fronts of the projectors and the camera have guides 94 which are also parallel to the screen in which may slide lens holders 95 having lenses 96. These lenses may, therefore, be located in the axial center line of the aperture plate or to one side or the other, but the lenses move in a plane parallel to those of the aperture plates and the screen. Therefore, images formed by the picture and the matte on the screen may be accurately aligned and photographed by the camera.

In the specification I have described that a basic picture is obtained by the camera from which the original negative is formed and, if desired, a duplicate negative or a print from this is made, and I may proceed in using details from the basic picture for enlargements or diminutions or to use only parts of the basic picture somewhat in accordance with my patent application for Method and apparatus for making motion pictures, Serial No. 240,154, filed December 15, 1927, patented February 21, 1933, Patent No. 1,898,905. This application also illustrates printers suitable for my present procedure as well as means for adjusting the lenses.

I may also make various dissolves and other effects by the method and means for making dissolves and effects for motion pictures as set forth in my Patent No. 1,813,428, patented July 7, 1931; or I may make other types of dissolves by following the procedure of my patent application for method and means for making effects for motion pictures, Serial No. 225,162, filed October 10, 1927.

Various changes may be made in the details of construction without departing from the spirit or scope of the invention as defined by the appended claims.

I claim:

1. The method of making motion pictures which includes projecting a negative film on a field and appropriately bordering the desired portions of the projected picture by projecting a bright light on the undesired portions and photographing the field.

2. The method of making photographic pictures which includes producing a negative of the subject, producing a matte to appropriately frame the subject by eliminating unwanted portions thereof, projecting the negative and the matte upon the same field in superposed relationship whereby light transmitted through the matte will eliminate on the field the unwanted portions of the picture, and photographing the combined projection.

3. The method of making pictures which includes simultaneously projecting a negative film and a matte on opposite sides of a platinized mirror capable of reflecting one image and transmitting the other in superposed relationship whereby light portions of the matte image will eliminate unwanted portions of the negative image on the mirror and photographing the combined projections.

4. The method of making motion pictures which includes projecting a negative motion picture film on a field, and simultaneously projecting a matte on the field in superposed relationship to the projected picture whereby light transmitted by the matte will eliminate unwanted portions of the picture and appropriately border the desired portions thereof, and photographing the combined projection on the field.

JOHN F. SEITZ.